United States Patent [19]

Kozuki

[11] 4,082,372
[45] Apr. 4, 1978

[54] NOISE REDUCING DEVICE FOR A TRACK CHAIN ARRANGEMENT

[75] Inventor: Naoto Kozuki, Sagamihara, Japan

[73] Assignee: Caterpillar Mitsubishi Ltd., Tokyo, Japan

[21] Appl. No.: 742,974

[22] Filed: Nov. 18, 1976

[30] Foreign Application Priority Data

Jan. 26, 1976  Japan .................................. 51-007251

[51] Int. Cl.² .............................................. B62D 55/12
[52] U.S. Cl. .................................... 305/57; 74/243 R
[58] Field of Search ............... 305/57, 56, 21; 74/443, 74/243 C, 243 R, 243 DR

[56] References Cited

U.S. PATENT DOCUMENTS 3,996,810  12/1976  Groff ................................ 74/443 X
4,034,618  7/1977  Groff et al. ........................ 305/57 X Primary Examiner—Robert B. Reeves
Assistant Examiner—John P. Shannon
Attorney, Agent, or Firm—John W. Grant

[57] ABSTRACT

A noise reducing device for a track chain arrangement in which a pair of track chains are trained around a sprocket. The noise reducing device reduces noise arising when the track chains come into engagement with sprocket teeth and includes a pair of annular supporting brackets secured to the opposite sides of the sprocket, a plurality of resilient members secured to the radial outer surfaces of the aforesaid pair of annular supporting brackets, and a pair of resilient metal hoops secured to the resilient members in concentric relation to the sprocket. The metal hoops are elastically deformed when the track chains engage the sprocket teeth.

5 Claims, 3 Drawing Figures

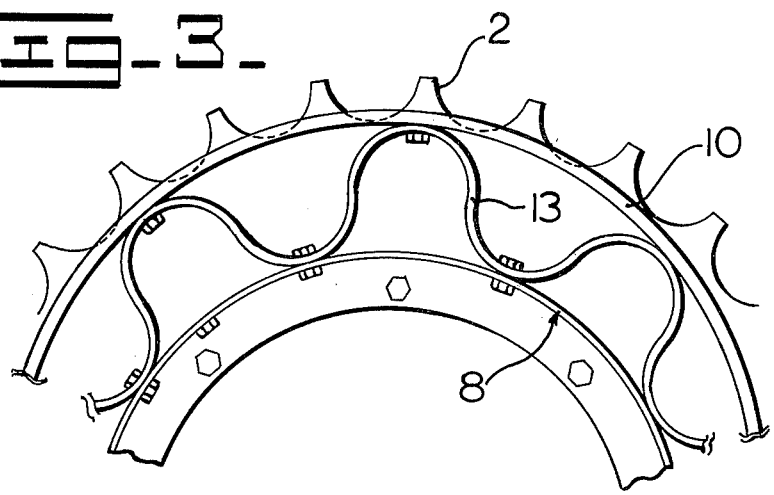
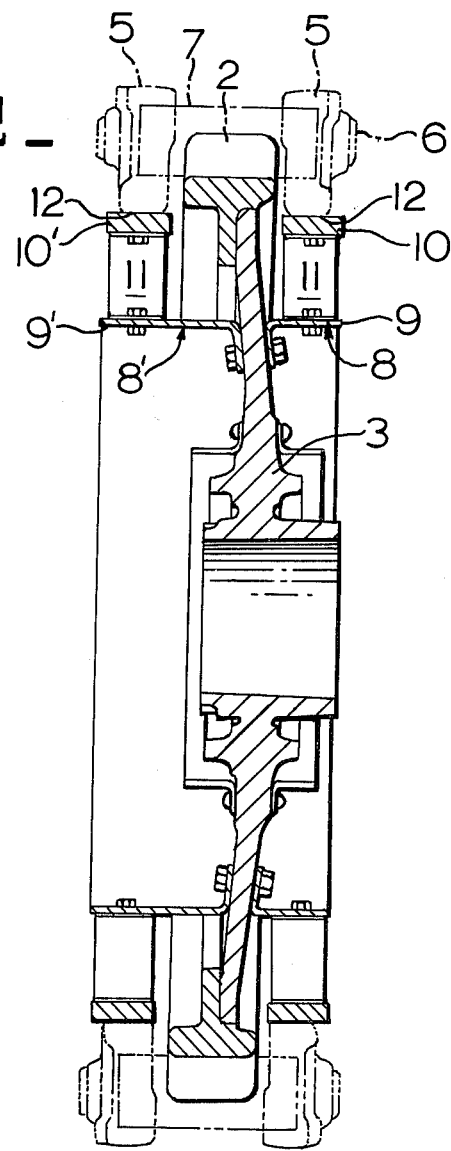

NOISE REDUCING DEVICE FOR A TRACK CHAIN ARRANGEMENT

BACKGROUND OF THE INVENTION

1. Field of the Invention

This invention relates to a track chain arrangement for use in a track-type tractor, and more particularly to a noise reducing device which reduces noise arising when track chains engage sprockets.

2. Description of the Prior Art

Track-type tractors in which track chains are trained around sprockets, generate metallic keen noise when the track bushings of the track chains come into direct engagement with the sprocket teeth upon running of the tractor particularly in reverse. To avoid this shortcoming, a previous attempt consisted of securing rubber members to the opposite sides of a sprocket so as to support the rail surfaces of the track links. However, the rubber members are subject to premature fatigue and wear due to their repeated contacts with the metal track links. A noise reduction means using the aforesaid rubber members is often used under severe environmental conditions such as rain fall and stony roads and premature deterioration of the rubber members occurs, and thus is not recommendable for the practical application. With the prior art noise reduction means, respective links of the track chains in engagement with the sprockets are supported by the rubber members individually, so that uniform shock absorbing action may not be achieved over the entire range of the track links in engagement with the sprockets.

SUMMARY OF THE INVENTION

It is an object of the present invention to provide a noise reducing device for a track chain arrangement which reduces metallic keen noise arising when track chains come into engagement with sprocket teeth and which provides a long service life.

Another object of the present invention is to provide such a noise reducing device which provides a desired shock absorbing action for the entire range of track chains which engage sprocket teeth.

According to the present invention, there is provided a noise reducing device for a track chain arrangement which chain arrangement includes a sprocket having a plurality of teeth provided thereon and a pair of endless track chains trained around the sprocket, the noise reducing device comprising a pair of annular supporting brackets secured to the opposite sides of the sprocket, a plurality of resilient members secured to the radial outer surfaces of said pair of annular supporting brackets, and a pair of resilient metal hoops individually outwardly spaced from and surrounding the annular supporting brackets and secured to the respective resilient members whereby said resilient metal hoops resiliently support the track chains when the track chains come into engagement with the sprocket teeth.

Other objects and advantages of the present invention will become more readily apparent upon reference to the accompanying drawings and following description.

BRIEF DESCRIPTION OF THE DRAWINGS

FIG. 2 is a cross-sectional view taken along the line II—II of FIG. 1; and

FIG. 3 is a view showing a modification of the noise reducing device according to the present invention with the track chains omitted.

DESCRIPTION OF THE PREFERRED EMBODIMENTS

Figure 1:
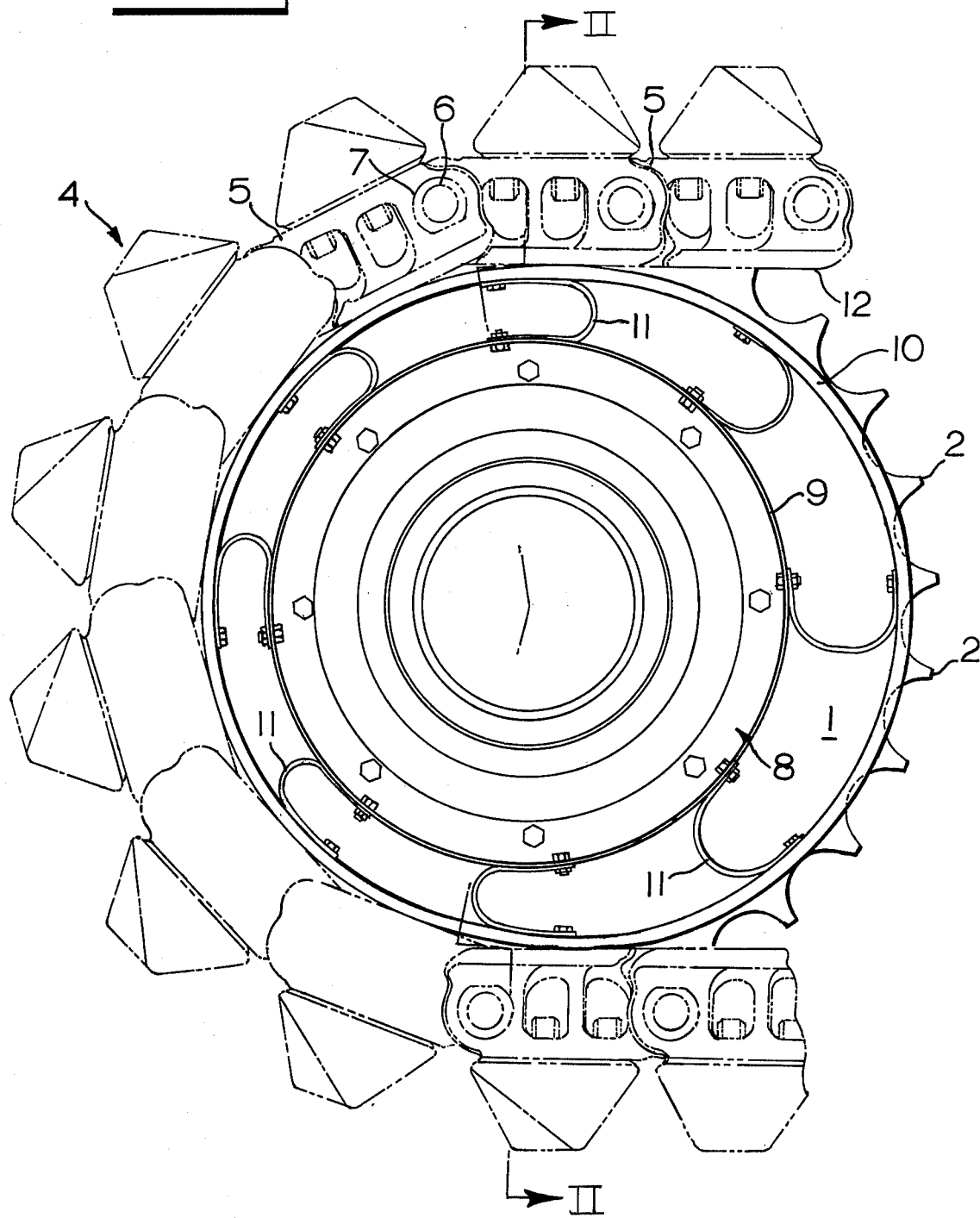
FIG. 1 is a side view showing a sprocket driving portion of a track-type tractor equipped with a noise reducing device according to the present invention.

Referring to FIGS. 1 and 2, there is shown a sprocket driving portion on one side of a track-type tractor. A sprocket 1 consists of a plurality of sprocket teeth 2 at its periphery and a hub 3 forming a central portion thereof. The hub 3 is mounted on a sprocket shaft in the usual manner so as to receive a drive force therefrom. In the embodiment shown, the sprocket teeth 2 are separable from the hub 3, and are secured to the perhipheral edge portion of the hub 3 by means of bolts or welding.

A track chain 4 is trained around the sprocket 1 in engagement with sprocket teeth, and the track chain 4 may travel either forwardly or rearwardly as shown by arrows, according to the direction of rotation of the sprocket. The track chain includes a plurality of track links 5 which are coupled to each other by means of track pins 6 thereby providing an endless chain. A track bushing 7 is fitted on each track pin 6, and hence the track bushings engage the sprocket teeth when the track chain comes into engagement with the sprocket 1. Track shoes and grousers are bolted to the track links in the usual manner. An idler (not shown) is provided forwardly of the sprocket.

A pair of annular supporting brackets 8, 8' are secured as by bolting to the opposite sides of the hub 3 of the sprocket 1 in concentric relation thereto. Each of the supporting brackets 8, 8' has an "L" shaped cross section, and includes flange portions 9, 9', respectively, projecting sidewise from the sprocket 1. A pair of resilient metal rings or hoops 10, 10' are positioned on the opposite sides of the sprocket hub 3 normally in concentric relation to the sprocket 1, respectively in surrounding or encircling relation to the annular supporting brackets 8, 8', respectively. The resilient rings 10, 10' are attached to the flange portions 9, 9' in a manner that when an external force is applied to the resilient rings, then the rings may be elastically deformed in a vertical direction and displaced in eccentric fashion in a horizontal direction. More particularly, a plurality of "U" shaped plate springs 11 are interposed between the resilient rings 10, 10' and the flange portions 9, 9' of the annular supporting brackets 8, 8' with the springs 11 having one of their ends secured to the resilient rings and their other ends secured to the flange portions 9, 9' by means of bolts and nuts. The resilient plate springs are equally spaced around the circumference of the annular supporting brackets.

The free state diameters of resilient rings 10, 10' are smaller than an addendum circle of the sprocket 1 but slightly larger than an inscribed circle of the track links 5 of the track chains 4. Accordingly, when the track chains travel around the sprocket, the resilient rings make initial contact with the track chains and are elastically deformed in a vertical direction.

With the aforesaid arrangement, as the track chains travel around the sprocket, the resilient rings 10, 10' first contact rail surfaces 12 of the track links 5, with the result that the plate springs 11 and the resilient rings 10, 10' are elastically deformed in a vertical direction and displaced in an eccentric fashion in a horizontal direction, as shown, due to the weight and drag force of the track chains. When the tractor runs forward or rearward, then the resilient rings are rotated with the rotation of the sprocket, while being elastically deformed and displaced in eccentric fashion in the aforesaid manner. In this respect, the resilient rings 10, 10' urge the track links radially outwardly, coupled with the resilient plate springs, when the track links separate from the sprocket. More particularly, upon forward or rearward running of the tractor, the track links 5 first contact the resilient rings 10, 10' on their rail surfaces 12 and thereafter the track bushings 7 engage the sprocket teeth 2. As a result, a shock absorbing action is achieved to lessen the impact between the track bushings and the sprocket teeth, thereby reducing to a great degree the metallic keen noise arising when the track bushings engage the sprocket teeth.

In addition, the aforesaid resilient rings are made of a metal so that no significant wear takes place on the surfaces of the resilient rings due to their repeated contacts with the rail surfaces of the track links. The track chains engaging the sprocket teeth may be resiliently uniformly supported to some degree by the resilient rings over the entire range of the chains in engagement with the sprocket, and hence a uniform shock absorbing action may be achieved between the track chains and sprocket teeth. In addition, when the track chains are separating from the sprocket, the track links are pushed away from the sprocket teeth due to reactions of the resilient rings and plate springs.

FIG. 3 shows another embodiment of the present invention. In this embodiment, a continuous corrugated plate spring 13 is disposed between the resilent ring 10 and the supporting bracket 8 in place of the "U" shaped plate springs.

While the drive portion and sprocket of only one side of the tractor has been described, the same description may be applied to the sprocket at the other side of the tractor. With the aforesaid embodiment, plate springs are used for coupling the resilient rings to the supporting brackets. However, the present invention is by no means limited to this instance, but coil springs or laminated plate springs may be used in place of the "U" shaped plate springs. Alternatively, rubber members may be interposed between the resilient rings and the annular supporting brackets along the entire or part of the circumferences of the annular supporting brackets.

With the aforesaid embodiments, the resilient rings or hoops are provided in the form of a single layer of a metal ring. However, the surfaces of the rings may be coated with vibration-damping material, rubber, or plastics. Furthermore, the ring itself may consist of laminated plate springs.

As is apparent from the foregoing description of a noise reducing device for a track chain arrangement according to the present invention, metallic keen noise arising when the track chains come into engagement with the sprocket is reduced to a great degree, and a long service life is insured, despite operation in severe environmental conditions such as rain fall and the like. In addition, a uniform shock absorbing action may be achieved over the entire range of the track chains in engagement with the sprocket teeth by means of the resilient rings having relatively high elasticity.

It will be understood that the above description is merely illustrative of the preferred embodiments of the invention. Additional modifications and improvements utilizing the discoveries of the invention can readily be anticipated by those skilled in the art from the present disclosure, and such modifications and improvements may fairly be presumed to be within the scope and purview of the invention as defined by the claims that follow.

What is claimed is:

1. A noise reducing device for a track chain arrangement, the chain arrangement being of the type which includes a sprocket having a plurality of teeth provided thereon and a pair of endless track chains trained around the sprocket, each chain having an inwardly facing surface, the noise reducing device comprising:
    a pair of annular supporting brackets secured to the opposite sides of the sprocket;
    a plurality of resilient members secured to the radially outer surfaces of said pair of annular supporting brackets;
    a pair of resilient metal hoops individually encircling and spaced outwardly from the annular supporting brackets and secured to the respective resilient members whereby said resilient metal hoops resiliently engage said inwardly facing surfaces of the track chains to lessen impact between the track chains and the sprocket teeth; and
    wherein each of said hoops has a free state diameter smaller than a diameter of an addendum circle of the sprocket teeth and slightly larger than a diameter of a circle formed by the inner surfaces of said track chains when the track chains are trained around and are in engagement with the sprocket.

2. The noise reducing device of claim 1 wherein said resilient members interposed between said annular supporting brackets and said resilient metal hoops are equally spaced along the circumference of said annular supporting brackets.

3. The noise reducing device of claim 1 wherein said resilient members are curved plate springs.

4. The noise reducing device of claim 1 wherein each of said annular supporting brackets includes a ring member disposed in concentric relation to said sprockets.

5. A noise reducing device for a track chain arrangement, the chain arrangement being of the type which includes a sprocket having a plurality of teeth provided thereon and a pair of endless track chains trained around the sprocket, each chain having an inwardly facing surface, the noise reducing device comprising:
    a pair of annular supporting brackets secured to the opposite sides of the sprockets;
    a plurality of curved plate springs secured to the radially outer surfaces of said pair of annular supporting brackets; and
    a pair of resilient metal hoops individually encircling and spaced outwardly from the annular supporting brackets and secured to the respective curved plate springs whereby said resilient metal hoops resiliently engage the inwardly facing surface of said track chains to lessen the impact between the track chains and the sprocket teeth.

* * * * *